June 26, 1934.  E. A. MOLLENHAUER ET AL  1,964,643
PISTON RING FILING DEVICE
Filed Jan. 14, 1933
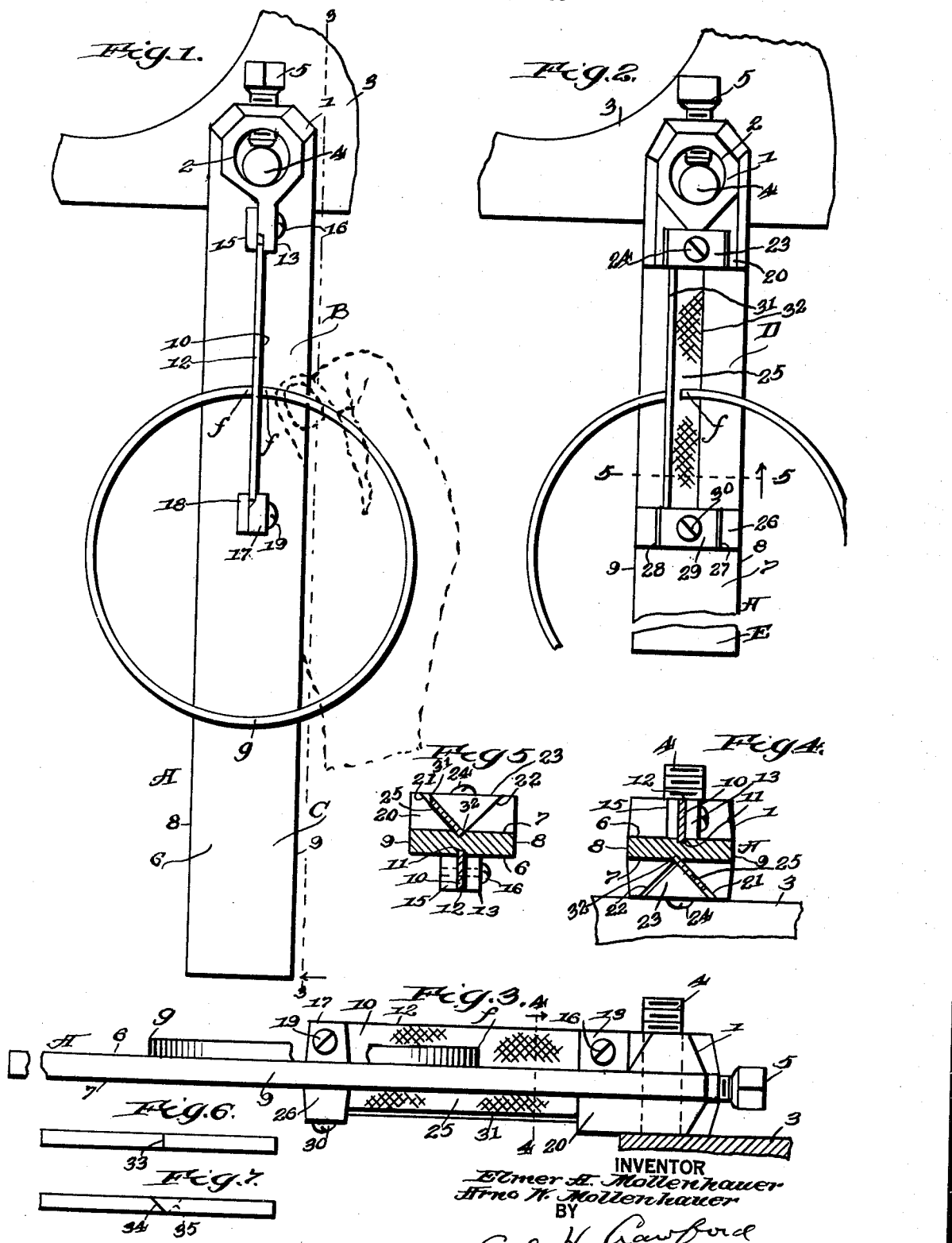

Patented June 26, 1934

1,964,643

UNITED STATES PATENT OFFICE 1,964,643

PISTON RING FILING DEVICE

Elmer A. Mollenhauer and Arno W. Mollenhauer, Spokane, Wash.

Application January 14, 1933, Serial No. 651,762

8 Claims. (Cl. 29—76)

This invention relates to improvements in tools for filing off and thereby reducing the ends of piston rings.

The ends of piston rings should be filed off or reduced with precision accuracy and it is a feature of this invention to meet this requirement by providing this improved tool with a ring alining face upon which the ends and the bight of the ring may be manually reciprocated to insure an accurate and constant position of the ring ends with respect to the file.

The invention has many other features and objects which will be more fully described in connection with the accompanying drawing and will be more particularly pointed out in and by the appended claims.

In the drawing:—

Fig. 1 is a plan view of the tool drawn actual size and shown anchored to a stud of an engine block, this side of the tool having a file disposed at right angles to the alining face.

Fig. 2 is a similar view of the tool looking down on the opposite face with the file shown disposed at substantially forty five degrees to the alining face for filing diagonally cut ring ends.

Fig. 3 is a sectional view on line 3—3 of Fig. 1, with the tool in side elevation.

Fig. 4 is a sectional view on line 4—4 of Fig. 3, looking toward the right of said figure.

Fig. 5 is a sectional view on line 5—5 of Fig. 2, looking in the direction of the arrow.

Fig. 6 is a view of a ring with flat abutting ends.

Fig. 7 is a view of a ring with diagonally cut ends.

Like characters of reference designate similar parts throughout the different figures of the drawing.

As shown, the tool includes an elongated and relatively narrow bar generally indicated at A, of the shape and cross section clearly shown in Figs. 1 and 4. The bar A is provided with anchoring or supporting means which, as shown, is in the form of a boss 1, that may either be cast integral with said bar A or attached thereto. Said boss 1 has a bore 2 extending lengthwise therethrough and which is preferably smooth, and of sufficient diameter to telescope over a bolt or stud element. I prefer to locate said boss 1 near or at one end of bar A, as it is a feature of the invention to adapt the tool for anchorage to any convenient element. I have indicated an engine block at 3, having upright studs 4, by means of which the top is secured. Thus, the improved tool can be disposed with the boss 1 over a stud, and means such as a set screw 5, is provided on the boss to engage stud 4 and thereby anchor bar A rigidly in a suitable working position, which is preferably though not essentially a substantially horizontal position, as shown in Fig. 4. This disposition of the boss 1, disposes the greater length of the bar A in a free and projected position with respect to the point of anchorage thereby rendering it easily accessible for the operator. If desired, a bolt may be clamped in a vice and the tool mounted on the bolt, just as it is shown mounted on stud 4.

While it is within the province of the invention to provide a single tool, and is so claimed, still, it is a very special feature of the invention to embody the latter in the form of a duplex tool, as will presently appear.

Both sides, 6 and 7, of bar A, are machined and preferably though not necessarily ground to present plain, and plane alining surfaces or faces of smooth and preferably of precision accuracy, and it is desired to emphasize the fact that alining faces 6 and 7 are thus prepared not merely as a matter of finish or appearance but as a feature of the invention, as will later appear. The side edges 8 and 9, are likewise smoothly machined and are accurately parallel and they function as gauge edges.

Reference will next be made to the file and the novel anchorage means therefor.

First referring to alining face 6, as shown in Figs. 1 and 3, I have shown a file 10 having its lowermost side edge disposed along and near, and if desired, in engagement with face 6, and the latter is preferably grooved or recessed at 11 so that the lowermost edge 10 will not only be slightly below the face 6, but will be securely held by the recess against lateral flexure or displacement. The upper edge 12, of file 10, is above face 6, and the disposition is such that both sides of the file will be readily accessible, the file, broadly speaking, being in an upright position, and more specifically, at right angles to face 6. It will be clear that the file 10 is located between the gauging sides 8 and 9 and is disposed forwardly toward boss 1, leaving the remaining length of bar A free and unobstructed. Boss 1 has a flange 13 and a clamping lug 15 serves with said flange to engage both sides of the forward end of the file to hold the latter in place when a set screw 16, that is threaded through lug 15, is turned home, as will now be clear.

The remaining end of said file 10, is anchored by means which, as shown, consists of a clamping lug 17, secured to or formed integral with bar A, and a clamping plate 18 which is threaded to receive a set screw 19. When the latter is turned home, the rear end of file 10 will be securely anchored. Now the clamping lug 17 and plate 18 perform the additional function of an abutment limiting rearward movement of the ring in case the operator moves the ring too far, as will later appear.

It is important now to point out that that area of face 6, abreast of file 10 and between the anchorage devices therefor, will be termed the ring end supporting portion B, and that area in the rear of the abutment anchorage device 17 and 18, will be termed the bight supporting portion C and these portions B and C are in alined contiguous relation, as shown.

It will now be clear that we have thus far described a completely operative tool in the foregoing description of one side thereof, and hence the tool would be highly serviceable even though it was not duplex.

We will next describe the remaining side of the tool and show the advantages of the duplex form.

The boss 1 is provided with a substantially V-shaped extension seat 20 whose faces 21 and 22 are disposed, in the drawing, at forty five degrees to face 7. A retainer 23, of like form, co-acts with said faces 21 and 22 and a set screw 24 extends through said retainer and into the extension seat and serves to clamp file 25, or rather the forward end thereof, securely in place.

A V-shaped seat 26, is secured to or formed integral with bar A, and is provided with faces 27 and 28, inclined like those indicated at 21 and 22, and a retainer 29 has complementally formed faces and is adapted to be secured by a set screw 30. It will now be clear that the forward and rearward ends of file 25, have anchorage devices for securely holding the file at a forty five degree angle to face 7, with one edge 31 of said file uppermost and the remaining edge 32 disposed along and, if desired, and shown, slightly seated in an elongated recess in face 7. It will be clear that file 25 may be anchored either in the inclined position shown in Fig. 2, or disposed between the opposite sets of inclined faces of the anchorage devices so as to be inclined just opposite to the disposition shown in Fig. 2, the advantages of which will later appear. It will also be clear that seat 26 forms a stop abutment in addition to functioning as a file holder, the same as lugs 17 and 18. The disposition of file 25 shows that both sides thereof are readily accessible between the points of anchorage and that the file is disposed between the gauging sides 8 and 9.

That area abreast of file 25, and between the anchorage devices thereof, will be termed the ring end supporting or alining portion, as indicated at D, and the remainder of face 7, in the rear of seat 26, which is clear and unobstructed, will be termed the ring bight supporting or alining portion E and these portions D and E, are shown to be in alined and contiguous relation.

In Fig. 6, we have shown a simple form of ring having flat abutting ends 33, for which the file 10 would be used. In Fig. 7, we have shown a ring with ends cut diagonally, as indicated at 34, in full lines. In dotted lines, we have shown at 35 how a ring may be cut diagonally in the opposite direction, and it will now be clear why it is sometimes necessary to change the position of file 25.

It will be understood by those skilled in the art that there are many types of rings with stepped and other various kinds of terminal ends but we have found in actual practice and use of this tool that it meets all requirements.

It will thus be seen that on one side of the bar, the file is disposed at right angles to the alining faces thereof and on the other side of the bar, the file is disposed at an oblique or acute angle to the alining faces. However, in either form, the file is in an upright position since both faces of the file are accessible for engagement by opposite ends of the ring, therefore, we consider that the phrase "upright position" is generic to any angular position of the file that affords accessibility to both sides or faces thereof.

At this point, we desire to emphasize the fact that filing piston ring ends is clearly a precision operation requiring great accuracy in high class work, as is well known to skilled mechanics.

The operation will next be described.

Assuming that the ring ends to be filed are flat, then the tool would be mounted as shown in Fig. 1, with face 6, uppermost. The ring ends f would be disposed in the position shown abreast of opposite faces of file 10 and they would be resting on alining portion B, of bar A, and they are held downwardly against said portion while they are being filed. The bight portion g, of the ring, rests upon and is held down against the bight alining portion C, which, as shown, is contiguous with portion B, and disposed accurately in the same plane. Therefore, it will now be clear that these two portions of the bar A, will accurately support the ring while it is being reciprocated so that the terminal ends of the ring will always be in accurate predetermined relation with respect to opposite faces of the file 10. This is due to the two point suspension of the ring, the ring ends being supported on portion B, and the bight g, being supported on portion C.

We have illustrated in dotted lines at the right of bar A, how the right hand of the operator grasps the ring, the convex portion of the latter extending into the palm of the hand whereby pressure may be exerted to force the ring end against the file. It is noted that the thumb can engage the ring end very near the file to hold said end down against the alining face. The fore finger and the base of the hand lie against gauging edge 9, and because the latter is smooth, they can slide along said edge as the ring is reciprocated. Of course it will be understood that both hands are used and that the left hand will grasp the other end of the ring just as we have shown the right hand doing, and the ring will be reciprocated back and forth until the ends have been sufficiently reduced.

Now at this point, we desire to emphasize the importance of the elongated narrow bar A, which not only affords the ample area of alining the bight with the ring ends, but which, in addition thereto, permits the operator to grasp the ring ends so closely adjacent the file that said ring ends cannot chatter while they are being reciprocated, and they can be held securely downwardly against the alining surface during the filing operation. This is vastly important not only as regards a single alining face tool, but is doubly important in a duplex tool where both faces are to be used, and where the same advantage accrues irrespective of the position in which the tool is located.

In practice, the ring is rapidly reciprocated and the tendency of the operator is to look ahead toward the ring ends and sometimes the ring is retracted rearwardly too far, or beyond the average stroke. If the rear end of the file 10 was free and unobstructed, and the ring ends were drawn off the file and clear out of engagement with the rear end thereof, then the following forward stroke might break off the ends of a fragile ring, or one of the ends, as it would be usually impossible to register the gap between the ends, with the file, after the ring had been withdrawn therefrom. Now the lugs 17 and 18, form a stop abutment preventing the operator from accidently retracting the ring too far rearwardly along the file sides, and in practice, this has been found to be of very great advantage.

In filing off the ends of a diagonally cut ring, the boss 1, will be disposed over a stud of the engine block, or any other convenient anchorage, as shown in Fig. 2, and the screw 5 will be turned home. If the ring to be ground is diagonally cut as shown in full lines in Fig. 7, then the file 25, will be disposed in the position shown. If the ring is diagonally cut in accordance with the dotted line shown in Fig. 7, then the file 25 will be disposed at an inclination opposite to that shown in Fig. 2. The alining faces, and in fact all operative methods will otherwise be the same in the Figure 2, as in the Fig. 1 position.

The interdependence of the two sides 8 and 9, will be clear when it is considered that said gauging sides function irrespective of the position in which the tool is located, and hence there is a very clear interdependence between the two sides 6 and 7, of the single bar A, when it is considered that said bar A has a plurality of sides that function with the gauging edges 8 and 9.

It is believed that the operation and construction of this invention will be clear from the foregoing description and while we have herein shown and described one specific form of the invention, we do not wish to be limited thereto except for such limitations as the claims may impart.

We claim:—

1. In a tool for filing the ends of piston rings, an elongated narrow bar having ring end and bight supporting portions distributed lengthwise thereof in contiguous relation and provided on one end with an anchoring means to rigidly support said bar in a substantially horizontal position with its greater length extending away and free from its point of anchorage, a file disposed edgewise along said ring end supporting portion with one edge uppermost to render both sides of the file accessible to the ends of the ring, means on said ring end portion for securing one end of said file, and a ring end abutment means for anchoring the remaining end of said file and located in the ring end supporting portion, whereby the bight supporting portion will support the bight of the ring beyond said abutment means as the ring ends are reciprocated between the means for anchoring the ends of said file.

2. In a tool for filing the ends of piston rings, an elongated bar having a smooth face and provided with anchoring means for anchoring said bar, a file disposed edgewise and lengthwise along a portion of the face of said bar in an upright position to render both sides of said file accessible, and devices for anchoring the ends of said file, whereby a ring may be reciprocated along said face with the ring ends in engagement with opposite sides of said file.

3. In a tool for filing the ends of piston rings, an elongated narrow bar having a plane precision face comprising ring end and bight supporting portions, and said bar having gauging sides and being provided with anchorage means for anchoring said bar, a file disposed lengthwise of said ring end portion between said gauging sides and in an upright position to render both sides of said file accessible to the ends of a piston ring, and devices for anchoring both ends of said file, whereby the ends of a piston ring may be reciprocated against said file between said devices along said ring end portion and the bight of said ring engaging said face beyond said devices along said bight portion to maintain said ring ends in precision relation to said file.

4. In a tool for filing the ends of piston rings, a narrow elongated bar having a ring alining face and adapted to be anchored to dispose said face in a substantially horizontal position, a file disposed with one side edge disposed along and near a portion of the length of said alining face and the other side edge uppermost to render both sides of said file accessible to the ends of a piston ring, and means on said alining face for anchoring said file in different angular relations to said alining face for filing the ends of diagonally cut rings.

5. In a tool for filing the ends of piston rings, an elongated bar having a precision alining face comprising ring end and ring bight supporting portions and provided with smooth gauging side edges, whereby a ring may be held against and reciprocated on said face with precision accuracy, a file, and said bar having devices for anchoring said file along the ring end supporting portion of said alining face leaving the remainder of the bight supporting portion free and unobstructed to support the bight of said ring.

6. A tool for filing the ends of piston rings, comprising, a piston ring support for sustaining a ring and said support being sufficiently reduced in width with respect to the diameter of the ring to render the split end portions of the latter accessible to be gripped and contracted by the fingers of the operator, a file, and means for holding said file on said support in a plane to render both faces of said file accessible for engagement by the ends of the ring while the contracted ring and said file are moved relatively to each other with both ends of said ring engaging said file.

7. A tool for filing the ends of piston rings, comprising, a piston ring support for sustaining a ring and being of less width than the diameter of the ring to render the split end portions of the ring accessible to be gripped and contracted by the fingers of the operator, a file, and means for holding said file on said support at right angles thereto or in different planes with respect thereto to render both faces of said file accessible to the ends of the contracted ring and accommodate the latter irrespective of the angle which said ends are split with respect to the plane of the ring.

8. A tool for filing the ends of piston rings, comprising, a bar having means for supporting a ring for uni-planar movement back and forth along said bar with end portions of the ring free to be gripped by the fingers of the operator, a file, and means for holding said file on said bar in different planes dependent upon the angle said ring is split with respect to the plane of the ring for engagement of the ends of the ring with different faces of said file.

ELMER A. MOLLENHAUER.
ARNO W. MOLLENHAUER.